United States Patent [19]
Dixon et al.

[11] Patent Number: 4,609,317
[45] Date of Patent: Sep. 2, 1986

[54] FASTENING SYSTEM INCLUDING A PULL TYPE FASTENER FOR CONSTRUCTING ARTICLES SUCH AS SHIPPING CONTAINERS AND THE LIKE

[75] Inventors: Richard D. Dixon, San Juan Capistrano; Marvin R. Hicks, Riverside, both of Calif.

[73] Assignee: Huck Manufacturing Company, Irvine, Calif.

[21] Appl. No.: 764,842

[22] Filed: Aug. 9, 1985

Related U.S. Application Data

[63] Continuation-in-part of Ser. No. 743,954, Jun. 12, 1985.

[51] Int. Cl.⁴ .................. F16B 21/00; B21D 39/00
[52] U.S. Cl. .................................. 411/339; 411/43; 411/353; 411/369; 29/512; 29/520; 29/523; 403/408.1
[58] Field of Search ............... 411/39, 43, 338, 339, 411/352, 353, 360, 361, 362, 365, 501, 546; 29/512, 520, 523; 403/408.1

[56] References Cited

U.S. PATENT DOCUMENTS 3,209,807 10/1965 Ryner ............................... 29/520
3,515,419  7/1968 Baugh ............................... 411/43
3,771,410 11/1973 Swindt, II ........................ 411/338
4,033,243  7/1977 Kirrish et al. .................... 411/338

FOREIGN PATENT DOCUMENTS 2102057  1/1983 United Kingdom ............ 411/352

Primary Examiner—Gary L. Smith
Assistant Examiner—Neill Wilson
Attorney, Agent, or Firm—Harness, Dickey & Pierce

[57] ABSTRACT

A fastener for securing workpieces having aligned bores and including a tubular sleeve and a pin with the sleeve having an elongated sleeve shank and a through bore and the pin having an enlarged pin head and an elongated pin shank, the pin shank having a locking groove, a resilient retaining clip located in the locking groove and being axially captured therein, the retaining clip being of a split construction and having a relaxed outside diameter greater than that of the workpiece bores and being adapted to be located in at least one of the bores with an interference fit to thereby axially retain the pin to the workpieces in a pre-assembly, the retaining clip and pin lock groove defining a lock cavity, the sleeve shank having its free end adapted to be radially deformed into the lock cavity, the sleeve shank being adapted to buckle radially after the sleeve free end is deformed into the lock cavity whereby the fastener can accommodate workpieces varying in total thickness.

21 Claims, 9 Drawing Figures

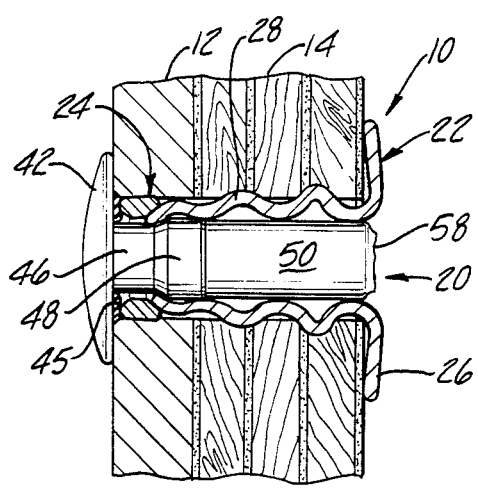
*Fig-5*
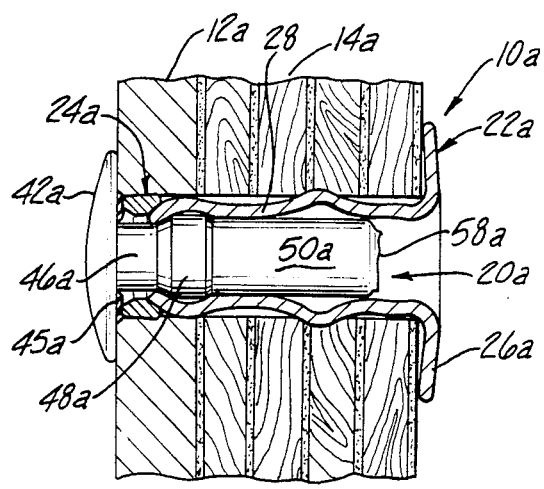
*Fig-6*
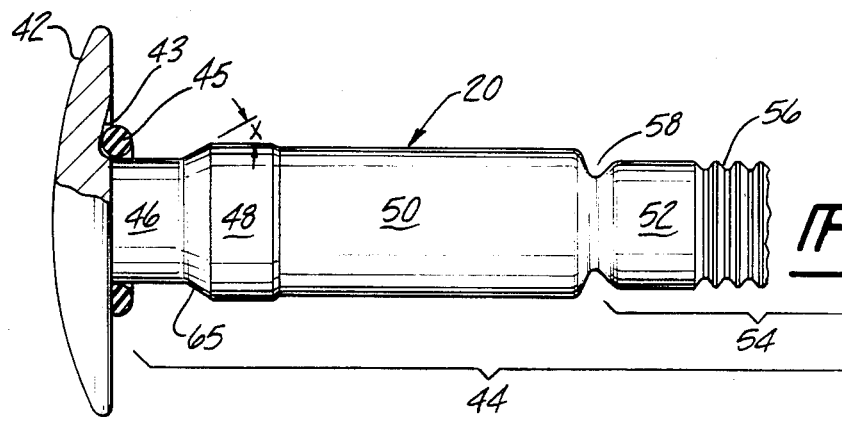
*Fig-7*
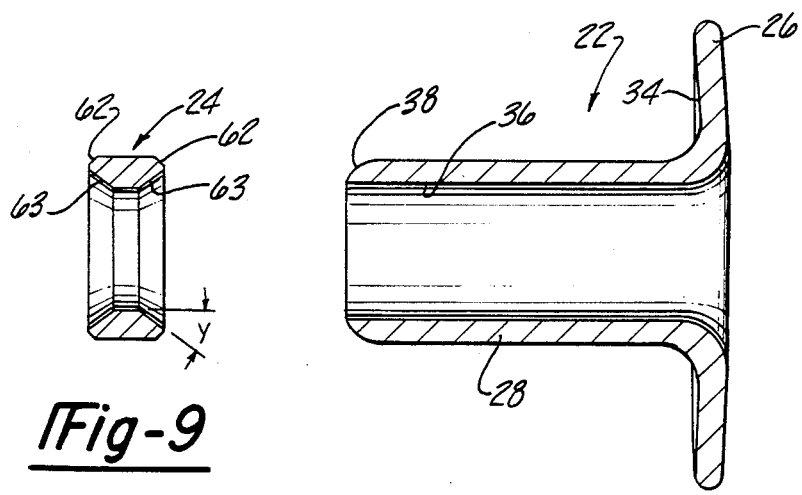
*Fig-8*
*Fig-9*

FASTENING SYSTEM INCLUDING A PULL TYPE FASTENER FOR CONSTRUCTING ARTICLES SUCH AS SHIPPING CONTAINERS AND THE LIKE

RELATED APPLICATION

The present application is a continuation-in-part of copending patent application for "A PULL TYPE FASTENER AND FASTENING SYSTEM FOR CONSTRUCTING ARTICLES SUCH AS SHIPPING CONTAINERS AND THE LIKE" Ser. No. 743,954, Filed June 12, 1985.

SUMMARY—BACKGROUND OF THE INVENTION

The present invention relates to a pull type fastener for a fastening system for manufacturing articles such as shipping containers and the like.

Articles such as shipping containers are frequently of a construction including a hard metal exterior layer and one or more interior layers of softer materials such as plywood, fiberboard, etc. In fastening the layers together, pull type fasteners can be used of a type generally shown in the U.S. Pat. No. 3,515,419 issued to C. W. Baugh on June 2, 1970.

The latter form of pull type fastener includes a pin and a sleeve and is set by applying a relative axial force between the pin and sleeve via a pull portion on the pin; the excess or pull portion of the shank of the pin is severed upon completion of the installation. With this type of fastener, it is desirable that the fastener component engaging the interior surface of the workpiece have a relatively large head to provide good load distribution to inhibit crushing. It is also desirable that the fastener, after being set, have a relatively low profile and a smooth surface on the interior side; in a container application this contributes to maximizing the interior load carrying volume and in avoiding snagging of the contents on fastener protrusions. It is also desirable that the set fastener inhibit tampering, i.e. unauthorized fastener removal. In some cases, it may also be desirable that the fastener have a large bearing, low profile head to engage the outer container surface.

One of the problems with fastening systems providing the above features is that the installation procedure can be time consuming and/or costly. For example with a fastener of the type shown in the Baugh patent, supra, numerous installation steps are necessary.

For example, in the fabrication of shipping containers, the body of the container is plywood, or the like with structural connections with the walls being made by metal brackets, straps, etc. Frequently these metal brackets, straps, etc. have preformed mounting holes. It is a common practice for the fastener to be installed by a single operator. Here the fastener opening through the container wall or body is first drilled by the operator from the outside or metal surface side. The operator then moves into the container or opposite side to insert a large headed sleeve (such as shown in Baugh). Now the operator returns to the exterior side of the container and inserts the shank of the cooperating pin into the sleeve with the pin head on the exterior side. Finally the same operator returns to the interior side, applies an installation tool to the protruding pin shank, and actuates the tool to set the fastener. It should be noted that in the above sequence there is a possibility that the sleeve or pin can fall out before the operator has had an opportunity to complete the next step. Of course, the number of steps required of a single operator would be somewhat simplified if two operators were used, i.e. one on the inside and one on the outside of the containers. In either case the procedure is costly.

With the present invention, a fastener construction is shown which facilitates installation by a single operator with a minimum of steps, i.e. the operator need move from outside to inside (or the reverse) only once to install the fastener. At the same time, the fastener of the present invention provides a unique mechanical lock to secure the pin and sleeve together. In some constructions, such as in the Baugh patent, supra, a friction lock is used to hold the pin and sleeve together. Thus, with that fastener, the magnitude of the installation load and hence ultimate clamp up of the workpieces was reduced to avoid excessive pin bounce and possible separation of pin and sleeve at pin break. With the mechanical lock of the present invention, the installation loads and hence final clamp up can be increased since pin bounce and separation of pin and sleeve upon pin break are inhibited.

In one form of the present invention a multiple piece fastener construction is utilized which fastener construction provides, among other features, the noted ease of installation and desirable mechanical lock.

The invention also provides means for readily accommodating workpieces varying in total thickness over a relatively wide range of thicknesses. The fastener of the present invention also provides a unique construction for retaining the pin in the workpiece openings prior to installation under a sufficiently high load to inhibit the pin from falling out or being pushed out during subsequent installation steps.

Thus it is an object of the present invention to provide a new and improved fastening system including a unique pull type fastener for securing structural assemblies of the type noted in which the fastener can be installed by a single operator with a simplified procedure.

It is another object to provide a fastener, of the above noted type, having a unique mechanical lock between pin and sleeve.

It is another object to provide a unique fastener construction in which the pin can be securely preassembled to the workpieces and held in place for the subsequent installation steps.

It is a general object of the present invention to provide a new and improved fastening system including a unique fastener construction for manufacturing shipping containers or the like.

Other objects, features, and advantages of the present invention will become apparent from the subsequent description and the appended claims, taken in conjunction with the accompanying drawings, in which:

FIG. 5 is a view similar to that of FIGS. 2 and 4 of the fastener after it has been installed;

FIG. 6 is a view similar to that of FIG. 5 depicting the fastener installed in a structural assembly with workpieces having a maximum total thickness for the fastener;

FIG. 7 is an enlarged, fragmentary elevational view with some portions broken away of the pin of the fastener of FIGS. 1-5;

FIG. 8 is an enlarged fragmentary sectional view of the sleeve of FIGS. 1-5; and FIG. 9 is an enlarged side elevational view of the retaining clip of the fastener of FIGS. 1-5.

Figure 1:
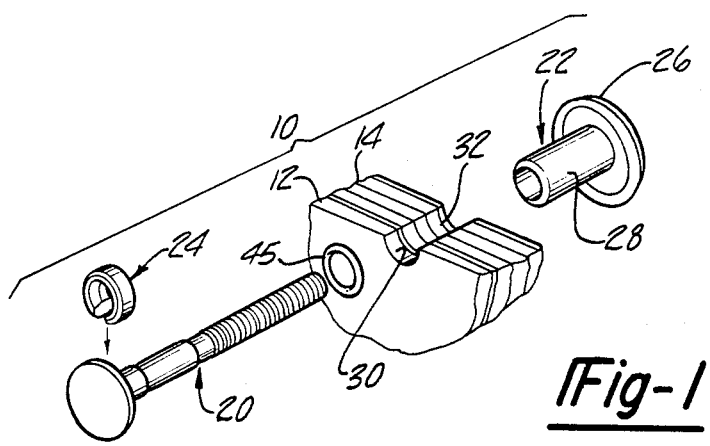
FIG. 1 is an exploded pictorial view of the components of the fastener of the present invention relative to a structural assembly to be secured together.
Figure 2:
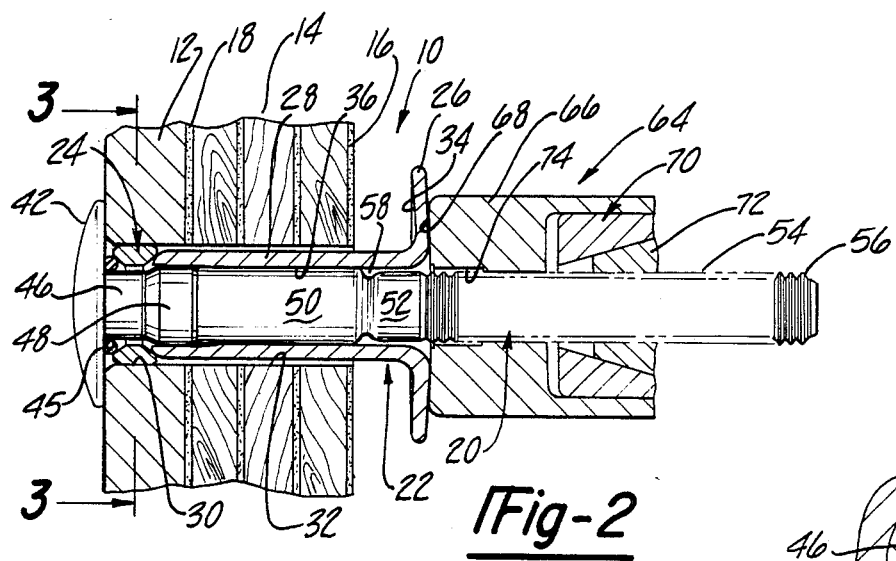
FIG. 2 is an elevational view with some parts shown in section of the fastener of FIG. 1, in a structural assembly to be fastened together of workpieces of a minimum total thickness for the fastener but prior to being installed.
Figure 3:
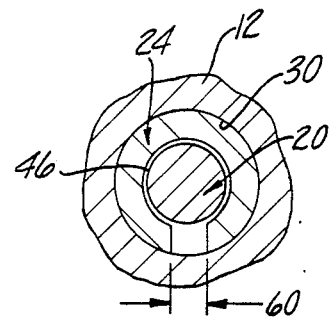
FIG. 3 is a sectional view of the fastener and structural assembly of FIG. 2 taken generally along the lines 3—3 in FIG. 2.

Looking now to FIG. 2, a fastener 10 is shown in assembly relationship with a plurality of workpieces 12 and 14. For a typical shipping container or the like, the workpiece 12 can be a metal bracket, strap, frame, etc. located at the exterior of the container and can be constructed of sheet metal such as steel or aluminum; the body or walls of the container can be constructed of members such as workpiece 14 which is fabricated of plywood, fiberboard, or the like, or other materials which have a relatively soft core and are susceptible to crushing under high, local loads. In the embodiment shown in FIG. 2, the workpiece 14 is constructed of a fiberglass reinforced plywood having a plywood core and fiberglass reinforced plastic layers 16 and 18 with the layer 16 defining the interior of the container. In this regard the plastic layers 16 and 18 are impervious to water to permit a watertight construction. It should be understood that the preceding materials for a shipping container have been discussed by way of example only and that the present invention can be utilized in other applications and with other materials.

Looking now to FIGS. 1-3 and 7-9 the fastener 10 includes a pin 20, a sleeve 22 and a retaining clip 24. The sleeve 22 has an enlarged head 26 and a generally straight shank 28 which is adapted to fit in a clearance relationship in at least some of the aligned bores 30 and 32 through workpieces 12 and 14, respectively. The sleeve head 26 is generally inwardly dished or concave on its inner surface 34 to provide clearance with the corner of bore 32 through inner workpiece layer 16. At the same time the concave structure distributes the installation and final clamp loads radially outwardly to inhibit excessive localized deformation or crushing of the inside workpiece 14. The sleeve shank 28 has a generally uniform outside diameter and a through bore 36 of a generally uniform diameter (see FIG. 8). The sleeve shank 28 terminates with its outer end surface 38 tapering radially inwardly. In one form, where the sleeve shank 28 had an outside diameter of around 0.380 inches and bore 36 had a diameter of around 0.305 inches, the tapered end surface 38 was defined by a 0.080 inch radius.

The pin 20 has an enlarged head 42 and an elongated shank 44. Pin head 42 is of a generally flat, truss head construction with its outer diameter being substantially larger than the diameter of bores 30, 32. The large head 42 has a low profile to provide a generally smooth surface at the exterior of the sheet metal workpiece 12. The pin head 42 is generally inwardly dished or concave on its inner surface 43 to provide clearance with the corner of bore 30. The concave structure also distributes the installation and final clamp loads. An annular sealing ring 45 is bonded to the inner surface 43 of the pin head 42. The sealing ring 45 can be made from a closed-celled polyurethane or equivalent and provides a watertight seal in a manner to be described.

The pin shank 44 is of a diameter smaller than workpiece bores 30, 32 and has a straight, smooth retaining shank portion defining a locking groove 46 adjacent the head 42 and a larger diameter straight, smooth intermediate pilot portion 48 followed by a slightly smaller diameter end portion 50. The diameter of intermediate pilot portion 48 is selected to provide a snug fit with the sleeve through bore 36 to pilot the end surface 38 relative to the retaining ring 24 in a manner to be seen. The pilot shank portion 48 is of a limited length and for use with a sleeve shank 22 of the dimensions noted would have an axial length of around $\frac{1}{8}$ inch.

Following the smooth end portion 50 is a generally straight shank portion 52 of reduced diameter which is a part of a pull portion 54 which includes a plurality of annular pull grooves 56. A reduced diameter annular breakneck groove 58 is located between the smooth end portion 50 and the pull portion 54 and defines the weakest portion of the pin 20.

As noted it is desirable to be able to insert the pin 20 into the workpiece bores 30 and 32 from the outside of the container and to have the pin 20 held therein with a sufficient retention force such as to permit the assembly of the sleeve 22 thereon from the opposite side and the application of an installation tool without the pin 20 falling out or being pushed out. One problem in this regard is that the openings 30 and 32 are not necessarily formed to close dimensional tolerances. In the present invention, and under the noted circumstances, the pin 20 can be preassembled into and securely retained in the openings 30 and 32 by the resilient retaining clip 24 which is adapted to be located on the pin 20 within the lock groove 46.

The retaining clip 24 is of a split ring construction and has a relaxed inside diameter which is of a preselected clearance with the lock groove 46. The inside diameter of clip 24 is substantially less than the diameter of the pilot shank portion 48 such that it will be axially and radially retained within the lock groove 46. The clip 24 is sufficiently resilient such that it can be readily expanded radially to be located in the lock groove 46.

The relaxed, outside diameter of the clip 24 is greater than the diameter of workpiece bore 30 in the metal workpiece 12. Now, with the retaining clip 24 assembled in the lock groove 46, the pin 20 can be inserted into the workpiece openings 30 and 32; the retaining clip 24 will be moved into the outer opening 30 and will be radially reduced in size to fit the opening 30 and hence will be held therein with a preselected frictional or interference fit. In this manner the pin 20 will be axially held to the workpieces 12 and 14 with a sufficient retention force such that the sleeve 22 can be assembled onto the pin shank 44 from the inside of the container and the installation tool applied thereto without the pin 20 falling or being pushed out. In order to facilitate insertion of the retaining clip 24 into the workpiece opening 30 the opposite radially outer edges 62 are chamfered or beveled (see FIG. 9). For a different purpose to be seen the opposite radially inner edges 63 are also chamfered or beveled. Note in this regard that both edges 62 and 63 are beveled so that the retaining clip 24 can be located with either edge facing the workpiece opening 30. The gap 60 between opposite ends of the retaining clip 24 is provided to be of a dimension such that with the clip 24 in its fully, radially compressed condition the gap 60 will not be fully closed; at the same time, the radially compressed inside diameter of the clip 24 will still provide clearance with the outer surface of the lock groove 46 in pin 20. In this manner, the pin 20 and retaining clip 24 can be securely, axially held in workpiece openings 30 and 32 even where these openings vary in size over a relatively wide tolerance range. At the same time there will be sufficient volume defined by this clip clearance with the lock groove 46 to define a lock cavity to receive the tapered end portion 38 of sleeve 22 to facilitate a locking action in a manner to be described.

The fastener 10 is set by the application of a relative axial force between the pin 20 and sleeve 22 via a pull tool 64 (partially shown) which can be of a type generally known in the art and hence the details thereof have been omitted.

To install the fastener 10, the operator first drills the workpiece bores 30 and 32 inwardly from the exterior workpiece 12. As previously noted, frequently the outer workpiece bore 30 will have already been formed. The operator now inserts the pin 20, with the retaining clip 24 attached, into the workpiece bores 30, 32. The latter assembly is moved into place with the clip 24 located in the bore 30 with an interference fit, as noted, so that the pin 20 and clip 24 are axially held in place for the remainder of the installation steps. Now the operator moves to the inside of the container or opposite side of the workpieces 12, 14 and places the sleeve 22 over the protruding portion of the pin shank 44. Next the tool 64 is applied to the fastener 10 and actuated by the operator to set the fastener 10. In this regard the tool 64 has an anvil member 66 having an engaging surface 68 which is concave to generally conform to the convex outer surface of the sleeve head 26. A collet assembly 70 is slidably supported within the anvil member 66 and has a plurality of chuck jaws 72 adapted to grippingly engage the pull grooves 56 of pull portion 54. A reduced diameter bore 74 located in the anvil member 64 is only slightly larger than the outside diameter of the pull portion 54 whereby it pilots the pull portion 54 into the opening defined by the chuck jaws 72.

The interference assembly force between the clip 24 and the workpiece bore 30 is sufficient to accommodate the insertion of the pin 20 into the chuck jaws 72 without the pin 20 and clip 24 being axially pushed from the bores 30, 32; thus, as noted the fastener 10 can be installed by a single operator with a minimum of installation steps.

Figure 4:
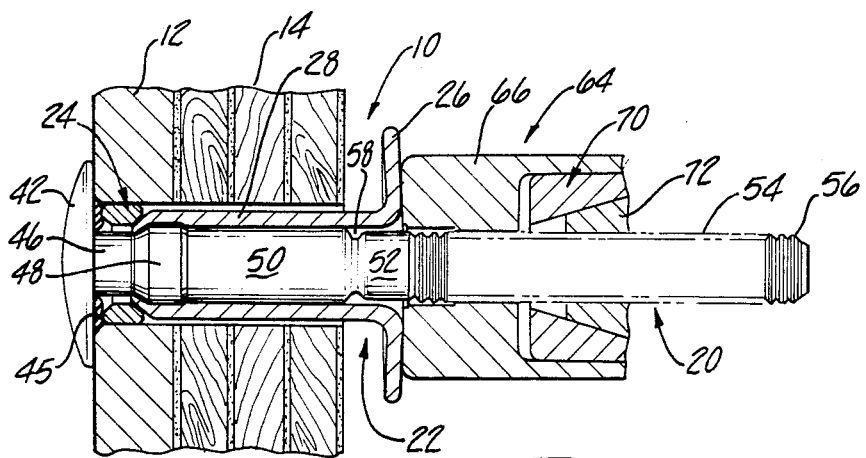
FIG. 4 is a view similar to that of the fastener of FIG. 2 depicting a first stage of installation of the fastener.

Upon actuation of the tool 64, the collet assembly 70 is moved axially rearwardly or away from the engaging surface 68 of anvil 66 whereby a relative axial force is applied between the pin 20 and sleeve 22. The axial force moves the sleeve shank 28 further onto the pin shank 44 with the tapered end portion 38 of the sleeve shank 28 moving the clip 24 into the cavity under pin head 26. The clip 24 will engage the sealing ring 45 to deform it radially outwardly to provide a watertight seal between the pin 20 and outer workpiece bore 30. As the relative axial force continues to increase, the end portion 38 of sleeve shank 28 as it engages the tapered clip surface 63 is moved radially inwardly into the lock cavity defined by the pin lock groove 50 (see FIG. 4) and the retaining clip 24.

The leading end of the lock groove 46 is defined by a transition portion 65 which is inclined at an angle X relative to the axis of pin 20. At the same time tapered inner edges 63 on retaining clip 24 are tapered at an angle Y relative to its axis or the axis of pin 20. The angles X and Y are selected such that the confronting surfaces of edge 63 and transition portion 65 diverge in a direction away from the pin head 42. In this way these surfaces cooperate to define an annular funnel like shape which promotes the insertion of the tapered sleeve end portion 38 into the space between the retaining clip 24 and lock groove 46. In one form the transition portion angle X was 30° while the retaining clip angle Y was 35°. Thus it is preferred that these surfaces are either diverging (as noted) or parallel but not converging in a direction away from the pin head 42.

As shown in FIGS. 1–5, the workpieces 12 and 14 define a minimum workpiece thickness to be fastened together by the fastener 10. In this situation, then, the enlarged sleeve head 26 will not be finally seated against the inner layer 16 until further movement relative to the pin 20. The latter movement is permitted by sleeve shank 28. Thus after the lock has been formed between sleeve end portion 38 and pin lock groove 46, the tool 64 will continue to apply an increasing relative axial force between the pin 20 and sleeve 22. The increased column load on the sleeve shank 28 will cause it to buckle radially outwardly. Because the core material of the workpiece 14 is relatively soft, it will be readily deformed by the buckled material of the sleeve shank 28. This will continue until the enlarged sleeve head 26 engages the inner workpiece layer 16.

At this point the sleeve head 24 has now engaged the inside layer 16 of workpiece 14 and axial movement of the sleeve 22 is arrested as the workpiece 12 and 14 are now clamped together. As the relative axial force increases, the pin shank 44 will be severed at the breakneck groove 58 and the installation is completed as shown in FIG. 5. The mechanical lock provided by the material of the sleeve end portion 38 as deformed into the pin lock groove 46 retains the load clamping the workpieces 12 and 14 together.

Note that the tapered sleeve portion 38 will deform into the lock groove 46 more readily than the buckling will occur at the sleeve shank 28. This is to assure that the lock will be formed before deformation for grip adjustment. It should also be noted that the retaining clip 24 is located in bore 30 in outer workpiece 12 which is made of a material of sufficient strength to radially maintain the shape of the clip 24 as the sleeve end portion 38 is deformed into the lock cavity defined by locking groove 46 and the clip 24.

As noted the grip adjustment provided by the buckling of sleeve shank 28 permits the fastener 10 to be used in fastening workpieces varying in total thickness over a significant range. FIG. 6 depicts the fastener in a condition for fastening workpieces have a maximum total thickness. Thus in the description of the assembly of FIG. 6, components similar to like components of FIGS. 1–5 have been given the same numerical designation with the addition of the letter postscript "a" and hence the description of such similarly number components will not be fully repeated.

Thus in FIG. 6 the total thickness of workpieces 12a and 14a is the maximum for fastener 10a (which is identical to fastener 10). In this condition the sleeve head 26a has been moved to its final engaged position against the inner layer 16a of workpiece 14a and the fastener 10a set without as much buckling of the sleeve shank 28a. Note that with either the minimum grip condition of FIGS. 1–5 or the maximum grip condition of FIG. 6, the remaining portion of the breakneck groove 58, 58a will not extend outwardly beyond the confines of the sleeve head 26, 26a. This is to assure a relatively smooth interior surface whereby snagging, etc. is inhibited.

The above construction is especially advantageous when the fastener 10, (10a) is constructed of relatively hard materials. In one form of the invention the pin 20, (20a) was constructed of AISI Type 305 Stainless Steel having a hardness of around 17–23 Rc, the sleeve (22, 22a) was of AISI Type 316 Stainless Steel having a hardness of around 70–80 Rb and the retaining clip 24, (24a) was of Monel Alloy R-405 having a hardness of around 80–90Rb. In this regard, the retaining clip 24, (24a) is substantially non-deformable axially in response to the loads imposed thereon by the sleeve shank 28, (28a). This facilitates the upsetting of the sleeve end portion 38, (38a) into the pin lock groove 46, (46a) as the buckling loads are applied to the sleeve shank 28, (28a) and reacted between the clip 24, (24a) and the lock groove 46, (46a).

Thus the fastener 10 (10a) of the present invention can be installed single-handedly by one operator with a simplified installation procedure while providing the noted advantages including a mechanical lock between pin and sleeve, a high clamp up of the workpieces, and a wide grip range.

While it will be apparent that the preferred embodiments of the invention disclosed are well calculated to fulfill the objects above stated, it will be appreciated that the invention is susceptible to modification, variation and change without departing from the proper scope of fair meaning of the invention.

What is claimed is:

1. In a fastening system for securing workpieces having aligned openings with at least one of the workpieces having a relatively soft core and another of the workpieces being of a relatively hard material with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said pin having an enlarged pin head and a pin shank, said pin shank comprising a generally uniform shank portion, a reduced diameter lock groove adjacent said pin head, a pull portion located on the end of said pin shank opposite said pin head and adapted to be gripped by a tool for applying a relative axial force between said pin and said sleeve to set the fastener, and a breakneck groove being located between said pull portion and said shank portion.

a retaining clip being of a split construction and adapted to be located and axially captured within said lock groove, said retaining clip being generally non-deformable axially, said retaining clip having a relaxed inside diameter greater than the diameter of said lock groove of said pin, said retaining clip having a relaxed outside diameter greater than that one of the aligned openings of that one of the workpieces of hard material and adapted to be radially compressed and located in that one of the aligned openings with an interference fit to provide a frictional connection to hold said pin and said clip in the workpieces in a pre-installed condition.

said retaining clip having a compressed inside diameter greater than the diameter of said pin lock groove to define therewith an annular lock cavity, said frictional connection being sufficient to hold said pin and said clip to said workpieces as said sleeve is inserted over said pin shank and the tool is applied to said pull portion, said sleeve shank having its free end engageable with said retaining clip and being radially deformed into said lock cavity in response to said relative axial force attaining a first preselected magnitude to thereby lock said pin and said sleeve together, said sleeve shank being adapted to deform radially outwardly in response to said relative axial force being of a second preselected magnitude greater than said first preselected magnitude to permit axial movement of said sleeve head into engagement with the confronting one of the workpieces, said sleeve shank deforming radially outwardly within the confines of the relatively soft core whereby radial outward deformation thereof is not inhibited, said pin severing at said breakneck groove when said relative axial force attains a third preselected magnitude greater than said first and said second preselected magnitudes after said enlarged sleeve head has engaged the opposite one of the workpieces.

2. The fastening system of claim 1 with said retaining clip and said pin lock groove having confronting spaced surfaces extending radially outwardly in a direction away from said pin head for guiding said free end of said sleeve shank into said lock cavity.

3. The fastening system of claim 1 with said retaining clip and said pin lock groove having confronting spaced surfaces extending radially outwardly in a direction away from said pin head for guiding said free end of said sleeve shank into said lock cavity, said confronting surfaces being non-converging in a direction away from said pin head.

4. The fastening system of claim 1 with said retaining clip and said pin lock groove having confronting spaced surfaces extending radially outwardly in a direction away from said pin head for guiding said free end of said sleeve shank into said lock cavity, said confronting surfaces diverging in a direction away from said pin head.

5. The fastening system of claim 1 with said retaining clip and said pin lock groove having confronting spaced surfaces extending radially outwardly in a direction away from said pin head for guiding said free end of said sleeve shank into said lock cavity, said free end of said sleeve shank being tapered to facilitate movement into the space between said spaced surfaces.

6. The fastening system of claim 1 with said retaining clip and said pin lock groove having confronting spaced surfaces extending radially outwardly in a direction away from said pin head for guiding said free end of said sleeve shank into said lock cavity, said pin shank having an annular pilot portion of limited length located adjacent said pin lock groove and being of a diameter larger than the remainder of said shank portion to snugly receive said sleeve shank to pilot said free end of said sleeve shank into the space between said spaced surfaces.

7. The fastening system of claim 1 further comprising an annular resilient seal member located under said pin head and adapted to be engaged by said retaining clip and to be deformed radially outwardly to provide a seal between said pin and said aligned opening in said hard material.

8. In a fastening system for securing workpieces having aligned openings with the workpieces being such that the opposite sides of the workpieces are separately accessible but simultaneously inaccessible by a single operator, said system comprising:

a fastener including a tubular sleeve and elongated pin, said sleeve having an enlarged sleeve head and an elongated sleeve shank and a through bore, said pin having an enlarged pin head and a pin shank, said pin shank comprising a shank portion, a reduced diameter lock groove adjacent said pin head, a pull portion located on the end of said pin shank opposite said pin head and adapted to be gripped by a tool for applying a relative axial force between said pin and said sleeve to set the fastener, and a breakneck groove being located between said pull portion and said shank portion, a retaining clip being of a split construction and adapted to be located and axially captured within said pin retaining groove, said retaining clip having a relaxed inside diameter greater than the diameter of said lock groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a pre-installed condition, said retaining clip having a compressed inside diameter greater than the diameter of said pin lock groove to define therewith an annular lock cavity, said frictional connection being sufficient to hold said pin and said clip to said workpieces as said sleeve is inserted over said pin shank and the tool is applied to said pull portion, said sleeve shank having its free end engageable with said retaining clip and being radially deformed into said lock cavity in response to said relative axial force attaining a first preselected magnitude to thereby lock said pin and said sleeve together, said sleeve shank being adapted to deform radially outwardly in response to said relative axial force being of a second preselected magnitude greater than said first preselected magnitude to permit axial movement of said sleeve head into engagement with the confronting one of the workpieces, said pin severing at said breakneck groove when said relative axial force attains a third preselected magnitude greater than said first and said second preselected magnitudes after said enlarged sleeve head has engaged the opposite one of the workpieces.

9. The fastening system of claim 8 with said retaining clip and said pin lock groove having confronting spaced surfaces extending radially outwardly in a direction away from said pin head for guiding said free end of said sleeve shank into said lock cavity.

10. The fastening system of claim 8 with said retaining clip and said pin lock groove having confronting spaced surfaces extending radially outwardly in a direction away from said pin head for guiding said free end of said sleeve shank into said lock cavity, said confronting surfaces being non-converging in a direction away from said pin head.

11. The fastening system of claim 8 with said retaining clip and said pin lock groove having confronting spaced surfaces extending radially outwardly in a direction away from said pin head for guiding said free end of said sleeve shank into said lock cavity, said confronting surfaces diverging in a direction away from said pin head.

12. The fastening system of claim 8 with said retaining clip and said pin lock groove having confronting spaced surfaces extending radially outwardly in a direction away from said pin head for guiding said free end of said sleeve shank into said lock cavity, said free end of said sleeve shank being tapered to facilitate movement into the space between said spaced surfaces.

13. The fastening system of claim 8 with said retaining clip and said pin lock groove having confronting spaced surfaces extending radially outwardly in a direction away from said pin head for guiding said free end of said sleeve shank into said lock cavity, said pin shank having an annular pilot portion of limited length located adjacent said pin lock groove and being of a diameter larger than the remainder of said shank portion to snugly receive said sleeve shank to pilot said free end of said sleeve shank into the space between said spaced surfaces.

14. The fastening system of claim 8 further comprising an annular resilient seal member located under said pin head and adapted to be engaged by said retaining clip and to be deformed radially outwardly to provide a seal between said pin and said aligned opening in said hard material.

15. In a fastening system for securing workpieces having aligned openings with the workpieces being such that the opposite sides of the workpieces are separately accessible but simultaneously inaccessible by a single operator, said system comprising:

a fastener including a tubular sleeve and an elongated pin, said sleeve having an enlarged sleeve head and an elongated sleeve shank and a through bore, said pin having an enlarged pin head and a pin shank, said pin shank comprising a shank portion, a reduced diameter lock groove adjacent said pin head, a pull portion located on the end of said pin shank opposite said pin head and adapted to be gripped by a tool for applying a relative axial force between said pin and said sleeve to set the fastener, and a breakneck groove located between said pull portion and said shank portion, a retaining clip being of a split construction and adapted to be located and axially captured within said pin retaining groove, said retaining clip having a relaxed inside diameter greater than the diameter of said lock groove of said pin, said retaining clip having a relaxed outside diameter greater than that one of the aligned openings of one of the workpieces and adapted to be radially compressed and located in that one of the aligned openings with an interference fit to provide a frictional connection to hold said pin and said clip in the workpieces in a pre-installed condition, said retaining clip having a compressed inside diameter greater than the diameter of said pin lock groove to define therewith an annular lock cavity, said frictional connection being sufficient to hold said pin and said clip to said workpieces as said sleeve is inserted over said pin shank and the tool is applied to said pull portion, said sleeve shank having its free end engageable with said retaining clip and being radially deformed into said lock cavity in response to said relative axial force attaining a first preselected magnitude to thereby lock said pin and said sleeve together, said pin severing at said breakneck groove when said relative axial force attains a second preselected magnitude greater than said first preselected magnitude after said enlarged sleeve head has engaged the opposite one of the workpieces.

16. The fastening system of claim 15 with said retaining clip and said pin lock groove having confronting spaced surfaces extending radially outwardly in a direction away from said pin head for guiding said free end of said sleeve shank into said lock cavity.

17. The fastening system of claim 15 with said retaining clip and said pin lock groove having confronting spaced surfaces extending radially outwardly in a direction away from said pin head for guiding said free end of said sleeve shank into said lock cavity, said confronting surfaces being non-converging in a direction away from said pin head.

18. The fastening system of claim 15 with said retaining clip and said pin lock groove having confronting spaced surfaces extending radially outwardly in a direction away from said pin head for guiding said free end of said sleeve shank into said lock cavity, said confronting surfaces diverging in a direction away from said pin head.

19. The fastening system of claim 15 with said retaining clip and said pin lock groove having confronting spaced surfaces extending radially outwardly in a direction away from said pin head for guiding said free end of said sleeve shank into said lock cavity, said free end of said sleeve shank being tapered to facilitate movement into the space between said spaced surfaces.

20. The fastening system of claim 15 with said retaining clip and said pin lock groove having confronting spaced surfaces extending radially outwardly in a direction away from said pin head for guiding said free end of said sleeve shank into said lock cavity, said pin shank having an annular pilot portion of limited length located adjacent said pin lock groove and being of a diameter larger than the remainder of said shank portion to snugly receive said sleeve shank to pilot said free end of said sleeve shank into the space between said spaced surfaces.

21. The fastening system of claim 15 further comprising an annular resilient seal member located under said pin head and adapted to be engaged by said retaining clip and to be deformed radially outwardly to provide a seal between said pin and said aligned opening in said hard material.

* * * * *